United States Patent [19]

Rosheim

[11] 4,296,681
[45] Oct. 27, 1981

[54] FLUID DRIVEN SERVOMECHANISM

[76] Inventor: Mark E. Rosheim, 1851 Chester #4, Royal Oak, Mich. 48073

[21] Appl. No.: 94,045

[22] Filed: Nov. 14, 1979

Related U.S. Application Data

[63] Continuation-in-part of Ser. No. 884,903, Mar. 9, 1978, Pat. No. 4,194,437.

[51] Int. Cl.³ .............................................. F01C 9/00
[52] U.S. Cl. ........................................ 92/122; 92/125
[58] Field of Search ................ 92/120, 121, 122, 123, 92/124, 125

[56]  References Cited

U.S. PATENT DOCUMENTS

| | | | |
|---|---|---|---|
| 3,049,103 | 8/1962 | Dumm | 92/122 |
| 3,246,580 | 4/1966 | Huska | 92/125 |
| 3,731,599 | 5/1973 | Allen | 92/122 |
| 4,009,644 | 3/1977 | Higuchi et al. | 92/125 |
| 4,045,958 | 9/1977 | Wells | 92/120 |
| 4,174,655 | 11/1979 | Valente | 92/122 |

Primary Examiner—Paul E. Maslousky
Attorney, Agent, or Firm—Neil B. Schulte

[57]  ABSTRACT

A hydraulic servomechanism permitting a wrist like universal motion of an extending member through a generally hemispherical operating range in which a sphere or sphere-like drive member is mounted for movement in a spherical or sphere-like cavity and driven by fluid pressure in intersecting circumferential channels mounted either in the drive member or the support means. The circumferential channels are sealed by curved metal bands with gaskets along the edge. Hydraulic fluid enters the channels through ports in the sealing bands themselves so as to facilitate easier movement of the drive member.

12 Claims, 17 Drawing Figures

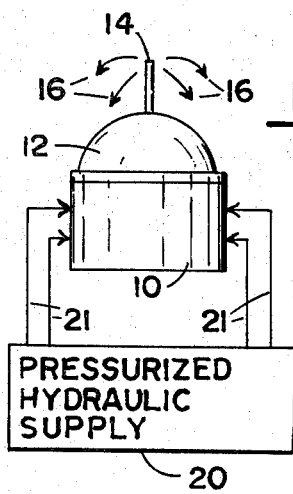
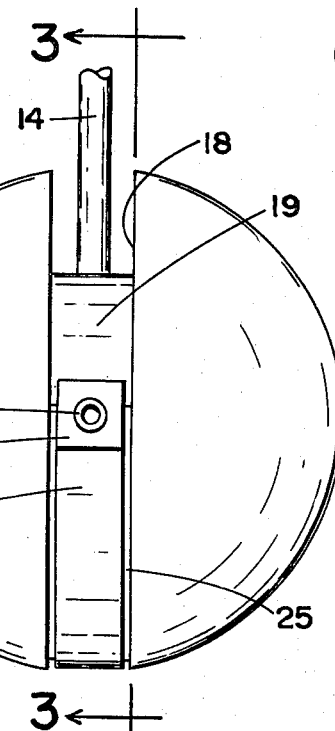
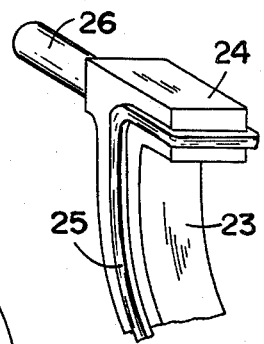
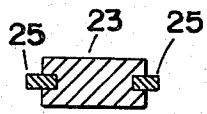
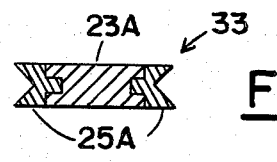
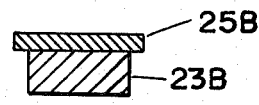
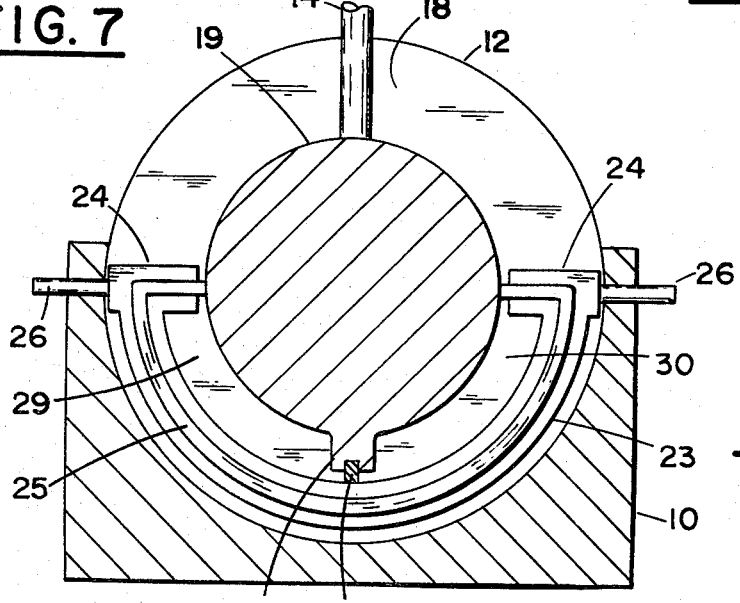
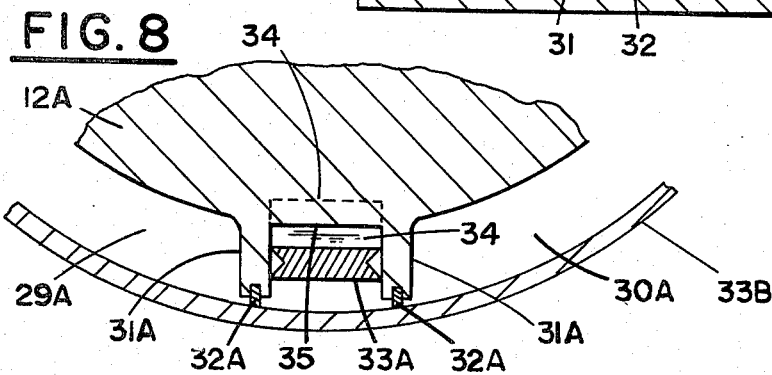

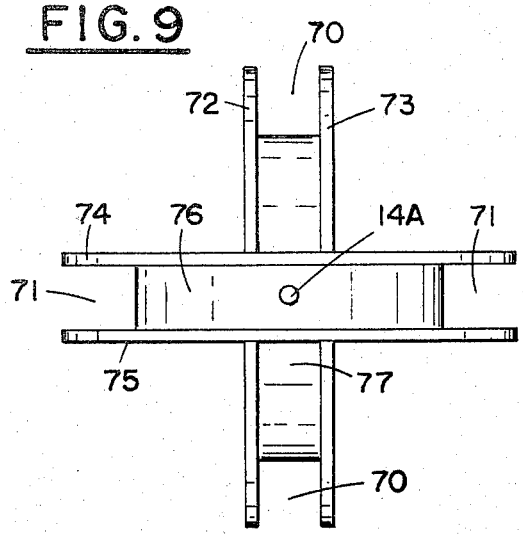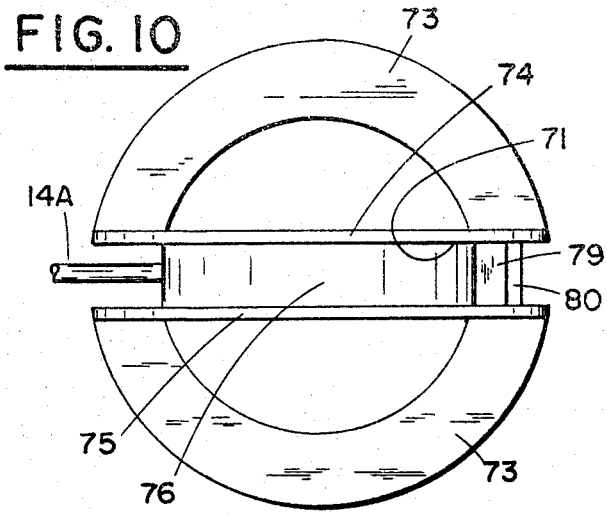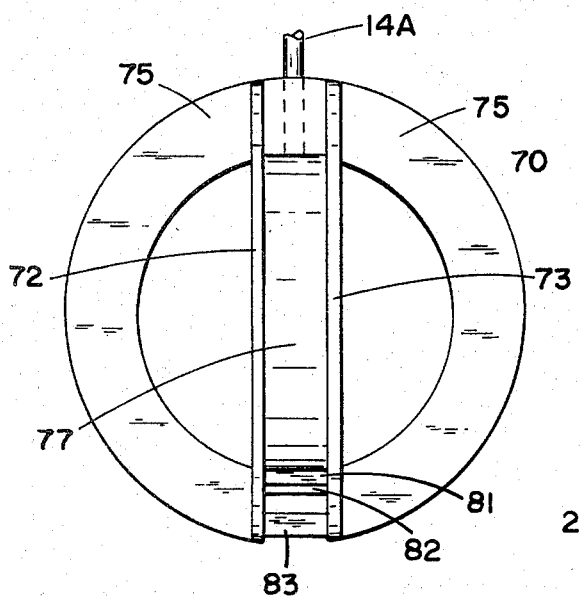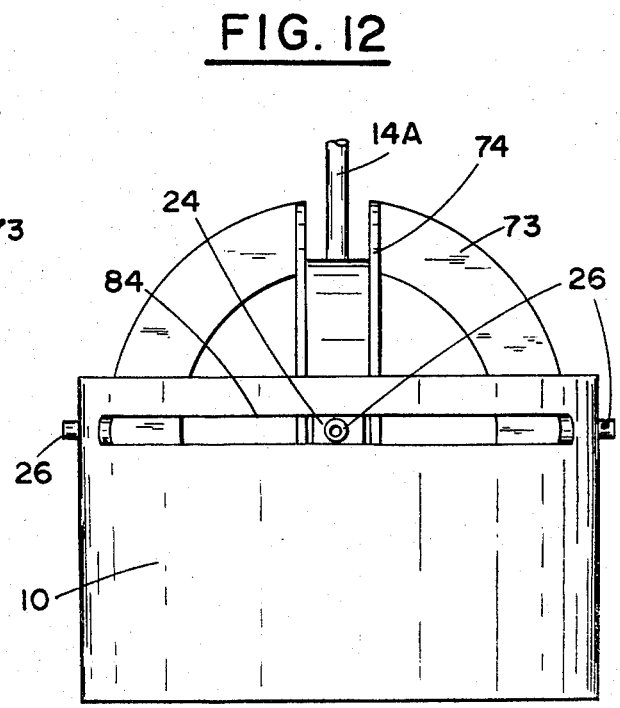

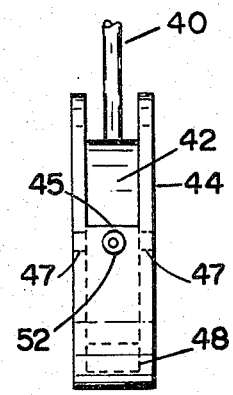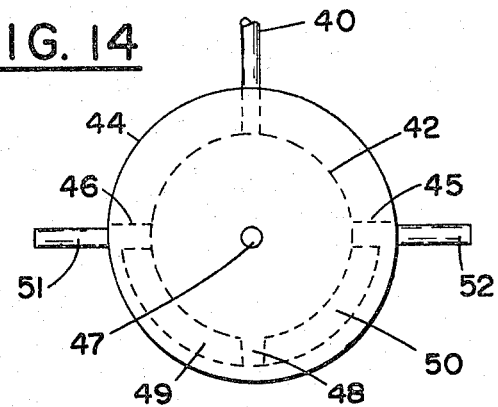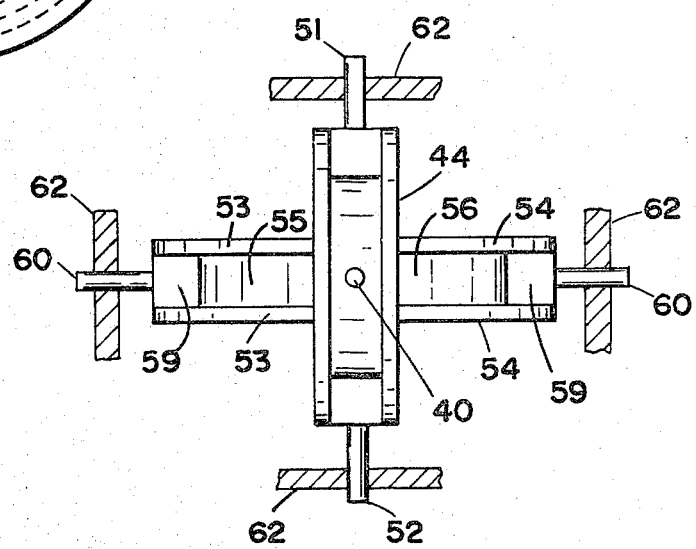

FLUID DRIVEN SERVOMECHANISM

BACKGROUND OF THE INVENTION

This application is a continuation-in-part of my co-pending Pat. application Ser. No. 884,903 filed Mar. 9, 1978, now U.S. Pat. No. 4,194,437.

The present invention relates to a fluid pressure powered servomechanism useful in providing a universal joint for devices such as robot arms, multidirectional scanning antennas, solar collecting mirrors, construction equipment, movable lights, prosthetics, and other devices requiring universal angular movements similar to a wrist action. In my co-pending parent application referenced above a similar mechanism is shown in which a spherical drive member is rotatable in a hemispherical pocket by means of pressurized fluid introduced into channels about the circumference of the spherical drive member. The present disclosure is similar but presents improved sealing bands adapted to permit the design to be easier moving, less expensive, simpler in construction, and less likely to leak hydraulic fluid.

SUMMARY OF THE INVENTION

Briefly, the instant invention demonstrates an improved sealing member which comprises a circumferential steel band disposed in a groove in a drive member. The band has terminal portions which block and enclose the circumferential chambers and also incorporate fluid admission ports positioned coincident with the rotational axis of the drive member. Thus, if desired, a minimum of support structure is necessary. Whereas the invention as shown in my parent application involves a large contact surface between the hemispherical seat and the spherical drive member, which surface must be perfectly formed to ensure a tight seal, the instant disclosure utilizes bands located immediately in the grooves themselves so as to more tightly control the sealing operation and permit looser tolerances between the sphere and the hemispherical seat. In the alternative, the support structure can be reduced to a mere mechanical pivot at the fluid admission ports themselves. In summary then, the present invention is simpler, less expensive, and more reliable. These characteristics comprise the objects of my invention along with the general improvement in operation. Further objects and advantages will become apparent upon consideration of the following detail description and drawings.

BRIEF DESCRIPTION OF THE DRAWINGS

FIG. 1 is a schematic drawing showing the general arrangement of major components in one embodiment of my invention.

FIG. 2 is an elevational side view of the central drive member of my invention.

FIG. 3 is a sectional view taken on line 3—3 in FIG. 2 of the member and also including a sectional view of the support means.

FIG. 4 is a perspective detail view of a portion of the sealing member.

FIG. 5 is an elevational side view of the same portion shown in FIG. 4.

FIGS. 6, 7, and 7A show various cross sections of the sealing band demonstrating different embodiments thereof.

FIG. 8 is a fragmentary sectional view of a portion of the drive member showing the structure associated with the intersection of two sealing bands.

FIGS. 9, 10, and 11 show respectively top, front, and side views of an alternative embodiment of the invention in which a sphere-like apparatus is used instead of the sphere shown in FIG. 2.

FIG. 12 shows how the above referenced alternative embodiments may be utilized in the same fashion as the sphere shown in FIG. 1.

FIG. 13 shows another embodiment of my invention in which the circumferential channel is formed in the support structure rather than in the central drive member.

FIG. 14 is a side elevational view of the structure of FIG. 13.

FIG. 15 shows the apparatus of FIG. 13 and 14 with an additional axis of rotation created with secondary circumferential channel structure.

FIG. 16 is a top view of the apparatus of FIG. 15.

DESCRIPTION OF THE PREFERRED EMBODIMENT

In FIG. 1 the present invention is schematically shown. A support means 10 comprising a generally hemispherical pocket encloses approximately half of the spherical drive member 12. An actuator arm 14 extending up from the drive member 12 is connected to whatever mechanism is to be moved. Movement can be in any of the directions shown by arrows 16 and indeed may include movement from any selected radial position directly to any other selected radial position. This wrist like universal motion is unique to the present invention and not found in the prior art.

Pressurized hydraulic fluid is delivered from a suitable supply source 20 through tubes indicated schematically by arrows 21. The actual connection points will be through trunnions described hereinafter.

The generally spherical drive member 12 is shown in FIG. 2 and in section in FIG. 3 taken on line 3—3 in FIG. 2. The rotational motion described at this point is about an axis extending generally horizontally in FIG. 2. This axis is circumscribed by a channel 18 formed in the surface of the sphere 12. Channel 18 extends nearly all of the way about sphere 12 so as to permit rotation of sphere 12 through nearly 180 degrees. Actuator arm 14 extends vertically out of the top of sphere 12 and is mounted in the bottom 19 of channel 18. A sealing means is formed in an arcuate shape to fit in channel 18 and comprises a metal band 23 having terminal portions 24 of a larger size. Along the edges of sealing band 23 is mounted a continuous gasket 25 which engages the side walls of channel 18. At the terminal portions 24 the gasket 25 turns inward and goes around terminal portion 24 to contact the bottom surface 19 of channel 18. The configuration of terminal portion 24 and gasket 25 thereabout is more clearly seen in FIG. 4. Sealing band 23 is positioned for the most part above the bottom of channel 18 so as to form a pair of chambers 29 and 30 on each side of a dividing wall 31. Dividing wall 31 comprises a riser extending up from central drive member 12 to a position proximate band 23. A small gasket 32 is mounted in or to dividing wall 31 so as to bear against band 23 and provide an effective seal between chambers 29 and 30.

Extending out from terminal portions 24 are a pair of rotatable trunnions 26 mounted in holes in support structure 10. Trunnions 26 are hollow as shown in FIG.

5 and communicate with a fluid admission port 28 so that fluid from pressurized hydraulic supply 20 may be introduced into the chambers 29 and 30 through the sealing band 23 and specifically through ports 28.

It may be readily seen that if fluid is introduced into chamber 29, dividing wall 31 will be caused to rotate along sealing band 23 to the right in FIG. 3 causing a counterclockwise rotation of actuator arm 14. Conversely, fluid directed into chamber 30 will cause a clockwise rotation. The spherical drive member 12 itself is free to rotate in the hemispherical pocket in support 10.

FIG. 6 is a cross sectional view of band 23 showing how the sealing gaskets 25 comprise strips bonded or otherwise mounted along the sides of metal band 23. However, alternative embodiments are equally useful and in some cases more appropriate. In FIG. 7 a metal band 23A is shown with sealing gaskets 25A mounted on the edges thereof. Gaskets 25A are of approximately the same width as band 23A producing a sealing band 33 which is particularly useful in the embodiment described hereinafter with respect to FIG. 8. In FIG. 7A yet another embodiment is shown in which a metal band 23B is provided with a gasket 25B bonded directly to one face thereof. With this type of sealing band, the gasket 25B would extend about the inner surface of band 23B and extend around the terminal portion 24 so as to bear against the bottom surface 19 of channel 18.

The embodiment of the invention described so far with respect to FIGS. 2 and 3 permits rotation in one axis only. Rotation about an intersecting perpendicular axis may be added simply with the addition of another circumscribing channel and sealing band. The second channel would have to be positioned, of course, at a radius slightly different from that of the first band so that the two would not interfere at the crossover point at the bottom of FIG. 2. Such an embodiment is shown in FIG. 8 with a fragmentary drawing of the bottom portion of the spherhical drive member 12A. In this two axis embodiment a sealing band 33A of the type described with respect to FIG. 7, is disposed in a first circumferential channel 35 at a slightly lesser radius than an intersecting circumferential band 33B which is shown arcuately in FIG. 8. The dividing wall described with respect to FIG. 3 now comprises a suitable sealing gasket 34 mounted in a suitable recess in the bottom of drive member 12A and bearing against the surface of sealing band 33A. Two dividing walls 31A separate chambers 29A and 30A and bear against sealing band 33B with the aid of two small sealing gaskets 32A disposed in the ends of dividing walls 31A. Thus, each of the circumscribing channels is divided into separate portions and drive member 12A may be rotated left or right in FIG. 8 by fluid pressure in chambers 29A and 30A or in and out of the plane of the drawing in FIG. 8 by fluid pressure on either side of dividing member 34. The combination of these two rotational motions will permit the actuator arm connected to drive member 12A to be moved from any radial position to any other radial position along any desired path.

Since the instant invention provides effective hydraulic seals in each groove it is not necessary that the spherical drive member exactly match the hemispherical pocket in support 10. In fact, it is not necessary to have a spherical surface at all. It is possible to eliminate major portions of the spherical structure provided that the essential circumscribing grooves be retained. This embodiment is shown in FIGS. 9 through 12. The alternative embodiment of FIGS. 9 through 12 comprises a sphere-like structure having the requisite circumscribing channels but eliminating all unnecessary mass so as to permit easier movement and manufacture. Referring simultaneously to the top view of FIG. 9 and to the two orthogonal elevational side views of FIGS. 10 and 11 it may be seen that two intersecting channels 70 and 71 are created by the simple assembly of a pair of washer shaped discs 72 and 73 with a second pair of washer shaped discs 74 and 75. Intersecting cylindrical bands 76 and 77 form the bottom of the circumferential channels 70 and 71. Again an actuating arm 14A is mounted upright at the top of the structure. In FIG. 10 a divider wall 79 with a small gasket 80 is positioned to bear against the sealing band having the larger radius. In the other channel 70, shown in FIG. 11, a dividing wall 81 and a gasket 82 will engage a sealing band positioned at a lesser radius so as to pass underneath the sealing band in channel 71. An additional sealing wall or divider 83 extends over the top of the intersecting sealing band to keep the sealing band bearing against gasket 82. This structure is essentially identical to that described with respect to FIG. 8. However, it will be noticed that the embodiment of FIGS. 9 through 11 eliminates most of the spherical surfaces associated with the embodiments of FIGS. 1 to 3. However, since the overall shape of the embodiment shown in FIGS. 9 through 11 is still sphere-like, it may be mounted in the hemispherical support structure 10 shown in greater detail in FIG. 12.

The sphere-like structure of FIG. 9 is mounted in a hemispherical pocket in support structure 10 in FIG. 12 with sealing bands 23 of the type described with respect to FIGS. 2, 3, 4, and 5. The trunnions 26 extend through four openings in the support structure 10. At least two such openings should be extended to form circumferential slots 84 to permit full freedom of rotation. As actuator arm 14A rotates in and out of the plane of the drawing in FIG. 12 the distance between the trunnions 26, as measured about the circumference of support 10, must vary. Thus, slot 84 allows at least two of the trunnions 26 to slide sideways and accomodate this change in distance.

Still another embodiment of the invention is shown in FIGS. 13 and 14. In this embodiment the circumscribing channel is formed from a pair of chambers 49 and 50 in a support structure 44 about the drive member rather than in the drive member itself. A disc shaped drive member 42 is mounted for rotation about a pivot axis 47 in a support structure 44. An actuator arm 40 is mounted in the top of disc 42. In FIG. 14 a side elevational view of the same structure is presented. The lower half of support structure 44 comprises the sealing band. The resultant cavity is divided into two chambers 49 and 50 by a divider wall 48 extending outward from drive member 42. Chambers 49 and 50 are terminated by terminal portions 45 and 46 which bear against drive member 42 and which may include gaskets similar to those described with respect to FIG. 8. Fluid from supply 20 may be introduced into ports 51 or 52 so as to pressurize chambers 49 and 50 respectively. This will cause divider wall 48 to move along the enclosed chamber and rotate actuator arm 40. Rotation in a second orthogonal axis is made possible by mounting the entire sturcture of FIG. 14 in a secondary set of discs which operate in a manner similar to the embodiments of FIGS. 9 through 11. In FIG. 15 it may be seen that support structure 44 has a pair of semicircular discs 53 mounted to one side and a pair of semicircular discs 54 mounted to the opposite side. Suitable semicylindrical surfaces 55 and 56 are formed so as to create a circumscribing channel similar to those already discussed. A sealing band 58 is mounted in this channel and includes terminal portions 59 and hollow fluid admitting trunnions 60 essentially identical to that described in FIGS. 3 and 4. A dividing wall 61 extends downward from members 55 and 56. The apparatus of FIG. 15 is shown in a top view in FIG. 16. Here it may be seen that each of the trunnions 51, and 52 extend outward through rotation allowing bearings in support structure 62. Trunnions 60 are also mounted in support structure 62 but need not rotate. Support structure 62 may comprise a hemispherical-like chamber or may simply comprise individual members joined at the bottom in a common support structure. The actuator arm 40 may be moved to any position by the introduction of fluid through trunnions 60, 51, or 52. The embodiment of FIGS. 15 and 16 is believed to be the simplest in construction and incorporates circumscribing channels formed both in drive members and in support structure. Clearly many variations of the present invention are possible by alternatively choosing the type of circumscribing channel desired and the particular type of support structure most convenient. Accordingly, I do not intend to be bound to the exact embodiments shown except as defined by the appended claims.

I claim:

1. A fluid driven servomechanism comprising:
 a support means;
 a central drive member mounted on said support means in a manner which permits rotational motion about one axis and also about a second axis which is generally perpendicular to said one axis;
 channel means disposed about said central drive member having a first channel partially circumscribing said one axis and a second channel partially circumscribing said second axis, each channel having walls and a bottom;
 a first sealing means disposed along a substantial portion of said first channel so as to enclose said substantial portion of said channel, said first sealing means including fluid admission ports therein to permit fluid to enter said substantial portion of said first channel and further including second sealing means disposed along a substantial portion of said second channel so as to enclose said substantial portion of said second channel, said second sealing means including fluid admission ports to allow fluid to enter said substantial portion of said second channel; and
 a first dividing means on said drive member and in said substantial portion of said first channel so as to divide the enclosed portion of said first channel and move said drive member about said one axis in response to a differential fluid pressure on opposite sides of said first dividing means and further including second dividing means similar to said first dividing means except located in said substantial portion of said second channel.

2. The apparatus of claim 1 in which each of said sealing means comprises a band extending along its respective channel above the bottom of the channel for a substantial portion of the channel so as to form a chamber therein, said band having sealing gaskets along the edge to engage the channel walls, said band also having larger terminal portions at each end which extend to the bottom of the channel to enclose said chamber therein.

3. The apparatus of claim 2 in which said fluid admission ports are positioned in said larger terminal portions.

4. The apparatus of claim 3 in which each of said dividing means comprise at least one riser wall in its respective channel extending up from the bottom of its respective channel to bear against said band so as to divide said chamber.

5. The apparatus of claim 1 in which the channel means disposed about the central drive member comprise outwardly opening grooves in the surface of the central drive member.

6. The apparatus of claim 5 in which each of said sealing means comprises a band extending along its respective channel above the bottom of the channel for a substantial portion of the channel so as to form a chamber therein, said band having sealing gaskets along the edge to engage the channel walls, said band also having larger terminal portions at each end which extend to the bottom of the channel to enclose said chamber therein.

7. The apparatus of claim 6 in which said fluid admission ports are positioned in said larger terminal portions.

8. The apparatus of claim 7 in which each of said dividing means comprise at least one riser wall in each of said channels extending up from the bottom of the channel to bear against said band so as to divide said chamber.

9. The apparatus of claim 1 in which said channel means disposed about said central drive member comprise at least one inwardly opening groove in said support means.

10. The apparatus of claim 9 in which each of said dividing means comprises at least one riser wall extending into said channel means from the drive member so as to divide the enclosed portion of said channel.

11. A fluid driven servomechanism comprising:
 a support means;
 a central drive member mounted on said support means in a manner which permits rotational motion about at least one axis;
 channel means disposed about said central drive member having a first channel partially circumscribing said one axis;
 a first sealing means disposed along a substantial portion of said first channel so as to enclose said substantial portion of said channel, said first sealing means comprising a band extending along said first channel above the bottom of the channel for a substantial portion of the channel so as to form a chamber therein, said band having sealing gaskets along the edge to engage the channel walls, said band also having larger terminal portions at each end which extend to the bottom of the channel to enclose said chamber, said sealing means including fluid admission ports therein positioned in said larger terminal portions to permit fluid to enter said substantial portion of said channel; and
 a dividing means on said drive member and in said substantial portion of said channel so as to divide the enclosed portion of said channel and move said drive member about said one axis in response to a differential fluid pressure on opposite sides of the dividing means, said dividing means comprising at least one riser wall in said channel extending up from the bottom of the channel to bear against the sealing means so as to divide the enclosed portion of the channel.

12. A fluid driven servomechanism comprising:

a support means;

a central drive member mounted on said support means in a manner which permits rotational motion about at least one axis;

channel means disposed about said central drive member having a first channel partially circumscribing said one axis which channel means comprises an outwardly opening groove in the surface of the central drive member;

a first sealing means disposed along a substantial portion of said first channel so as to enclose said substantial portion of said channel, said sealing means including fluid admission ports therein to permit fluid to enter said substantial portion of said channel; and a dividing means on said drive member and in said substantial portion of said channel so as to divide the enclosed portion of said channel and move said drive member about said one axis in response to a differential fluid pressure on opposite sides of said dividing means in said channel.

* * * * *